Figure 1:
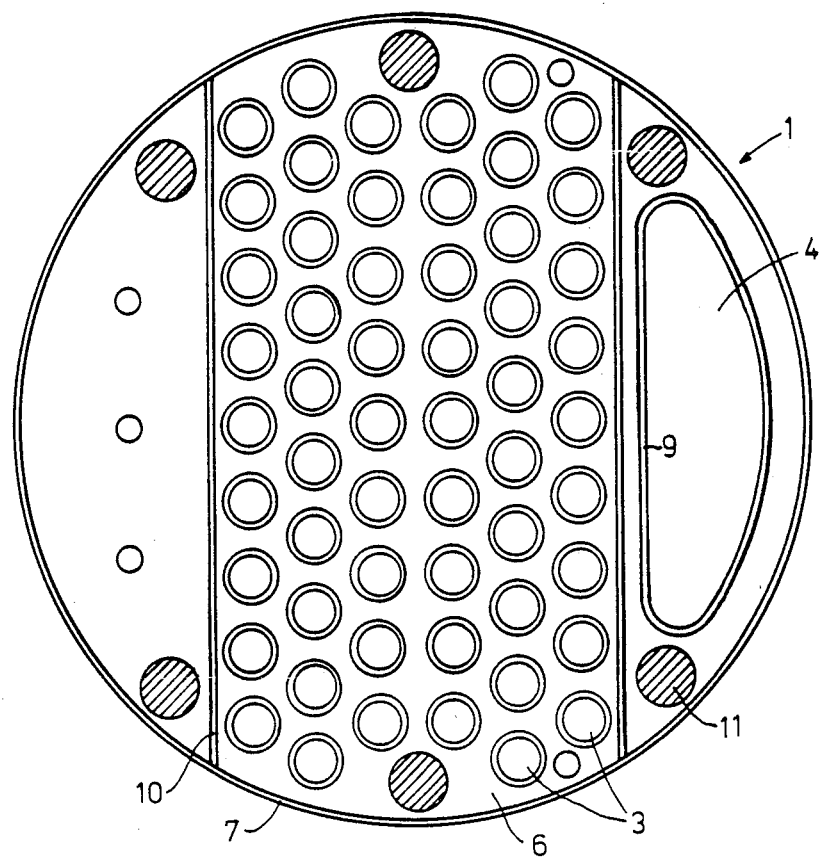

United States Patent [19]

Simon et al.

[11] Patent Number: 4,839,209

[45] Date of Patent: Jun. 13, 1989

[54] SHEET-SHAPED, CORROSION RESISTANT PARTS OF APPARATUS

[75] Inventors: Gehard Simon; Peter Hahnel, both of Leverkusen; Erhard-Günther Hoffmann, Ratingen, all of Fed. Rep. of Germany

[73] Assignee: Bayer Aktiengesellschaft, Fed. Rep. of Germany

[21] Appl. No.: 7,801

[22] Filed: Jan. 28, 1987

[30] Foreign Application Priority Data

Feb. 8, 1986 [DE] Fed. Rep. of Germany ....... 3604013

[51] Int. Cl.[4] ................................................. B32B 1/04
[52] U.S. Cl. ...................................... 428/68; 428/131; 428/137; 428/138; 428/224; 428/286; 428/415; 428/421; 428/422; 428/408; 428/902

[58] Field of Search ............... 428/284, 285, 415, 421, 428/422, 68, 131, 137, 138, 408, 902, 286, 224

[56] References Cited

U.S. PATENT DOCUMENTS

| | | | |
|---|---|---|---|
| 3,922,186 | 11/1975 | Segawa et al. | 428/421 |
| 3,993,827 | 11/1976 | Dukert et al. | 428/421 |
| 4,361,613 | 11/1982 | Bogner et al. | 428/71 |
| 4,463,043 | 7/1984 | Reeves et al. | 428/71 |

*Primary Examiner*—James J. Bell
*Attorney, Agent, or Firm*—Connolly and Hutz

[57] ABSTRACT

Large parts of apparatus are manufactured from a glass fibre reinforced core (2) enclosed in a thin heat-resistant and corrosion-resistant jacket (9) of PVDF attached thereto.

6 Claims, 1 Drawing Sheet

SHEET-SHAPED, CORROSION RESISTANT PARTS OF APPARATUS

This invention relates to sheet-shaped, corrosionresistant parts of apparatus, in particular column trays, with great dimensional stability under changing thermal and mechanical stresses, consisting of a multi-layered construction of polymers.

Parts of apparatus exposed to wide fluctuations in temperature and/or to corrosive media have hitherto been manufactured from high grade metals such as zirconium, tantalum and hastelloy. These materials have the disadvantage of being very expensive and still being subject to corrosion in certain circumstances.

It is also known to use parts of glass or graphite for such purposes. Although these have the necessary resistance to corrosion, they have little flexural strength under dynamic stress and little impact strength and can therefore only be used for relatively small parts and their properties therefore cannot be economically exploited in large production plants.

Solid synthetic resins are also used for the construction of apparatus. These may have a tendency to corrosion, depending on the product used, and they frequently have insufficient dimensional stability under changing temperature stresses.

Lastly, it is known in the prior art to use metal constructions plated with synthetic resins. These have the disadvantage that the plating is liable to become detached and crack due to differences in the thermal coefficients of expansion and the underlying surfaces are then subject to corrosion.

It was an object of the present invention to provide corrosion-resistant parts of apparatus which would retain their dimensional stability even under changing conditions of high thermal and mechanical stresses and in particular would retain their even surfaces and could be produced with diameters or lengths of sides >0.6 m, in particular >1.0 m and a ratio of length to wall thickness of from 20 to 40.

According to the invention this object is achieved in that the multi-layered structure comprises a weight-bearing, stable core of glass fibre reinforced synthetic resin firmly bonded on all sides to a jacket of heat-resistant and/or chemically-resistant polymer.

The firm bonding of the stable core to a corrosion-resistant jacket produces a system which is always able to make use of the optimum functions of the individual layers and is therefore particularly distinguished by its high dimensional stability as well as its chemical and thermal resistance.

It has thus become possible for the first time to produce column trays of synthetic resins with diameters greater than 1 m capable of withstanding high thermal and chemical stresses and sagging less than 1 mm per meter at temperatures above 100° C. and under a load of 50 kg. This means that in future bubble tray columns capable of withstanding much higher loads under wide ranges of concentration will be able to be used instead of packed columns even for corrosive media.

It has been found suitable to use glass fibres or carbon fibres as reinforcement for the core, and the fibre content should be in the region of 50% to 70%. The synthetic resin may be an epoxide, furan or phenol resin. These synthetic resins have a considerably higher chemical resistance than, for example, weight-bearing constructions of steel so that the emergency running properties of structures manufactured from these resins are considerably improved. The core may consist of a prepressed plate or it may be directly wet pressed in the mould together with a covering layer.

It has been found that even a thin jacket (3,4,5 mm) prevents the diffusion of corrosive media and thereby prevents destruction of the resin underneath the jacket. The range of application of the jacket may be further increased by the addition of electrically conductive fillers. The following are suitable polymeric materials: Thermoplasts, duroplasts, elastomers and rubber. These materials are bonded to the surface in the form of welded panels or applied to the core by lamination, spraying or other coating processes.

The covering layer and the weight-bearing core are joined together either through the intermediary of a fine textured fabric impregnated with bonding resin or directly by the material of the covering layer.

An example of the invention is illustrated in the drawing and described in detail below.

Figure 2:
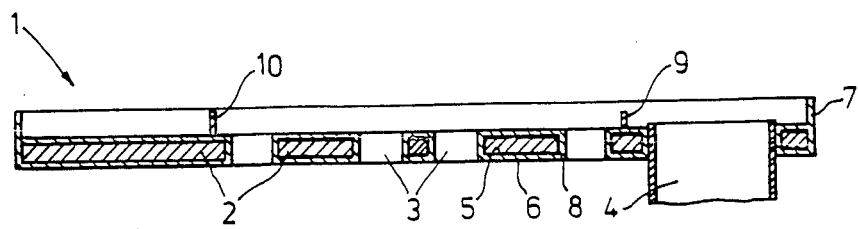

In the drawing, FIG. 1 is a top plan view of the bubble tray and FIG. 2 is a section through the bubble tray.

FIGS. 1 and 2 show a bubble tray 1 of a distillation tower (not shown), comprising a circular core 2 measuring 24 mm in thickness of glass fibre reinforced synthetic resin having a plurality of openings 3 for the bubbles and a larger opening 4 to serve as outflow. The surface of the bubble tray 1 including the vertical walls is enclosed in a jacket 7 of plates 6 of electrically conductive PVDF through the intermediary of a resin impregnated network 5, the plates being welded together at their butt joints 8 to form impervious connections. The overflow weirs 9 are also made of PVDF. The various bubble trays 1 arranged one above the other in the distillation tower are supported on one another by means of spacer members 10.

We claim:

1. Column trays of corrosion resistant parts, each having a low thickness compared with its extension and dimensional stability under changing thermal and mechanical stresses, consisting of a multilayered structure of polymeric material comprising (a) a weight-bearing stable sheet-shaped core with even surfaces and a plurality of openings therein, said core being of epoxide, furan or phenol resin reinforced with glass or carbon fibres in an amount of 50 to 70% by weight, and (b) a jacket of thermally resistant and/or chemically resistant polymers surrounding said core and attached to said core on all sides thereof.

2. Column trays of corrosion and resistant parts of apparatus according to claim 1, characterised in that the core and jacket are joined together through a network (5) containing synthetic resin.

3. Column trays of corrosion and resistant parts of apparatus according to claim 1, characterised in that the reinforced synthetic resin consists of an epoxide resin with glass fiber.

4. Column trays of corrosion and resistant parts of apparatus according to claim 1, characterised in that the jacket has a thickness of at least 3 mm and consists of a polyvinylidene fluoride.

5. Column trays of corrosion and resistant parts of apparatus according to claim 4, characterised in that the jacket is electrically conductive.

6. Column trays of corrosion and -resistant parts of apparatus according to claim 2, characterised in that the network consists of a synthetic, fine-textured fabric embedded in an epoxide resin.